United States Patent [19]

Tanasescu

[11] Patent Number: 4,648,707
[45] Date of Patent: Mar. 10, 1987

[54] READER-PRINTER SYSTEM

[75] Inventor: Leo Tanasescu, Redondo Beach, Calif.

[73] Assignee: Petro Fax, Inc., Casper, Wyo.

[21] Appl. No.: 806,539

[22] Filed: Dec. 9, 1985

[51] Int. Cl.$^4$ .................. G03B 13/28; G03B 27/32
[52] U.S. Cl. .................................. 355/45; 355/5; 355/43; 355/60; 355/77
[58] Field of Search ............... 355/5, 45, 43, 60, 77, 355/27

[56] References Cited

U.S. PATENT DOCUMENTS

| | | | |
|---|---|---|---|
| 3,094,036 | 6/1963 | Benson | 355/45 X |
| 3,115,815 | 12/1963 | Friedel | 355/27 X |
| 3,988,064 | 10/1976 | Sone et al. | 355/45 X |

*Primary Examiner*—Richard A. Wintercorn
*Attorney, Agent, or Firm*—Hugh H. Drake

[57] ABSTRACT

A readout system includes a source of illumination that is propagated along a predetermined path. Disposed in that path is a medium, such as a microform which carries a chart recording. An imaging screen is located in a portion of that path beyond the medium, and a projection lens system is adjustable to focus the image upon the screen. Also included is an image storage element disposed in a portion of the path of the illumination beyond the medium. The medium is moved along a given path which results in the sweeping of the image across the screen and also in the presenting of a moving section of the image in a discrete path to the storage element. The storage element in this case is the electrostatic drum of a xerographic copying machine. The length of the path is adjusted by means of interposing first and second reflectors mutually inclined at a reverse angle of forty-five degrees. Adjustment of the distance between those mirrors changes the path length. The outcome of the use of this system is the capability of adjusting the size of the stored image in order to ensure that it constitutes a faithful reproduction of that which is intended when ultimately printed in hard copy.

13 Claims, 9 Drawing Figures

READER-PRINTER SYSTEM

The present invention pertains to apparatus for both read-out of a recorded document and simultaneous print-out of selected portions of that document. More particularly, the invention pertains to apparatus for visually reproducing chart-type recordings or the like while at the same time enabling hard-copy print-out of portions of those recordings as selected by the user.

In many and varied different fields, the making of lengthy chart-type recordings has become routine both for monitoring a given activity as it occurs and also for creating a permanent record which subsequently may be studied in detail for correlation as between different segments of the chart recording or for more concentrated study of a given section of that recording.

One example can be found within the electric power industry. Different operating parameters of the overall power plant operation are continuously monitored and recorded. This is especially true in the case of nuclear power plants. Chart recordings also have become prevalent in the medical field, with continuously-monitoring charts reproducing, even over long periods of time, such representations as EKG's, EEG's, blood pressure and respiratory readings and the like. Analogous continuous recording techniques as applied to a monitor find use in experimentation and analysis of the effects pertaining to vibration and/or fatigue in and of materials.

Chart recordings are of great benefit in the geophysical field. In the drilling of an oil or gas well into the earth's surface, the ultimate hole may be 10,000, 20,000 or more feet in depth. As the bottom of the hole is drilled further downwardly, a hollow casing is inserted, section by section, in order to prevent the side walls of the hole from caving in by reason of having gone through unstable material. Once this hole is at least initially completed to a given depth, radioactive well logging is employed to determine the characteristics of the materials which have been penetrated. This involves the lowering into the hole of an emitter of radioactive material which passes through the walls of the casing and is reflected back to an associated sensor with a magnitude that varies in accordance with the kind of material encountered at a given depth. The sensed signals typically are fed to a chart recorder. A geologist or other trained person analyzes those charts to determine which soil characteristics, such as the existence of sand, are most likely to contain deposits of oil or gas.

In connection with the drilling and casing of such a well, another log is made to record the exact locations, in terms of distance and depth, of each collar which joins a successive section of the casing. That collar log again may appear in a chart recording and usually involves the lowering of a device which establishes a magnetic field and a sensor that detects the purterbation in that field caused by each successive collar as the sensor is lowered into the well. In that connection, it is insufficient merely to compute the number of pipe sections use in order to determine at what depth a collar ought to be. Even a minor variation of, say, 1/16th of an inch in the length of a casing section or in the degree of seating of a collar obviously will magnify to what may amount to many feet by the time a well depth increases to 12,000 feet, for example.

The strip chart on which the radioactive well logging data is recorded contains markers to indicate depth as the logging continues. Similarly, the collar log yields an indication which corresponds to depth. As a result, a geologist or other trained person, concerned with a given well, seeks to match the radioactive well log with the collar log in order to determine as certainly as possible that he knows exactly the depth at which it is likely that oil or gas will be encountered.

Knowledge of that exact depth is extemely important, because a next primary operation is to lower a detonating charge within the hole and then explode it over a selected length of casing in order to perforate that casing and hopefully allow the entrance of the oil or gas into the well hole. It is the desire in that operation, for obvious reasons, not to have that detonation destroy a collar-coupling. Moreover, this step in the overall proceeding is in itself expensive and time consuming, all of which becomes at least a waste if the perforation ends up having been made in the wrong place. Error in that respect could even lead to a well being abandoned unnecessarily. Again, accurate determination of depth is exceedingly important. When the operator is seeking to perforate a selected six-foot length of casing at a depth of, for example, 20,000 feet, only an extremely small cumulative error in determining depth can result in failure to achieve the desire objective.

Oil well logs serve another purpose. For many years, the log on each different well has been preserved in various collections. By literally mapping the different well logs throughout a wide-spread geographical area, a geologist is able to determine the contours beneath the earth's surface of the different kinds of strata which exist. In turn, that enables the geologist, with reasonable accuracy, to predict the proper depth necessary for a proposed new well in a different location from any other well but within that overall geographic area.

In consideration of all of the foregoing, even one inexperienced in the geophysical field will understand that the results of such operations include the production of literally miles of chart recorder paper. Both the operators and the curators of what may be called the archives faced enormous file-storage problems until the advent of microfilming. Prevalent in the geophysical field today is the reduction of such chart recordings onto microform transparencies typically of a 4×6 inch size and with a demagnification of either 12 times or 24 times. That standard microfiche usually contains five chart tracts. Thus, a given film with five tracts may contain a representation of something like six hundred feet of the original linear chart recording. In turn, that means that something like maybe just twenty very thin films may contain all of the recorded information from a log made on a well 12,000 feet in depth.

Correlative to the microforming has been the development of readers. They typically involve means for accepting the microform and projecting light through it to a projection lens which ultimately forms an image on a display screen. That display, in association with longitudinal and lateral movement of the microform under the control of an operator, enables the operator to study a reproduction of the original chart with magnification from the microform sufficient at least to provide meaningful readability.

Of course, various machines for making copies of original well logs are well known. The most prevalent seems to be the diazo approach, such as that used throughout many fields in the making of blueprints. Other photocopying techniques have been tried, but most use is of machines that incorporate the diazo approach. Diazo machines have proved to be extremely reliable and in themselves ae reasonably cost effective and of simple design which renders them compartively free from requirements for service. One extreme disadvantage of the diazo machines is that they employ the use of ammonia, a substance toxic to human personnel and corrosive with respect to associated or nearby electrical and electronic equipment. Moreover, the diazo process developer and paper are highly sensitive to light and heat as a result of which those elements require special storage and exhibit a rather short shelf life.

Various machines have been developed for printing from a microform onto either special or plain papers. Special papers have proved generally unsatisfactory by reason of not only expense but subsequent undesired marking when the surface is contacted physically. For all of the foregoing and other reasons, it is rather clear that, for reproduction from microforms, users would prefer a so-called plain paper copier, provided that it was able to provide a magnified reproduction with the retention of a high degree of resolution.

It will be recalled from the above discussion that the practice in the geophysical field requires the capability of extremely accurate comparison between one log and another, in that case a radioactive well log as against a collar log. The very same accuracy in making a comparison as between a first chart and what might be called a reference chart may exist in numerous applications within other fields. For example, medical personnel may need to make an accurate comparison as between a fresh chart obtained after a medication or procedure and a chart made at an earlier time, or an engineer may need to compare a test chart obtained during one mode of operation as compared with that obtained during another or an earlier mode of operation. In at least almost all of these cases, it is critical that there is a faithful reproduction with regard to size in both the longitudinal and lateral directions.

Unfortunately, recordation and reproduction systems generally have not proved to be that faithful, remembering, for example, that problem of very accurately locating a given six-feet down some 12,000 feet from the surface. The projection lens used to demagnify in connection with the making of a microform well may differ slightly in degree of magnification from the projection lens used in an image reproduction device. A difference that might not be noted as between that on the original and that ultimately read out or printed out if a comparison is made immediately may show up to be unduly significant after a time lapse. That is, recording and print-out materials, and even the housings of lens systems, may vary with age. While it is unknown to applicant exactly what changes may occur in a given lens system over a period of time nor to what degree the material of which the microform tranparencies are made may change with aging and/or dependence on humidity and temperature conditions during storage, it is readily observable and well known that paper, whether it be that or the original chart recording or that in a copy on paper, is subject to expansion or shrinkage, usually shrinkage, over a period of time. When that occurs, later comparisons as between an event recording and a reference recording may be misleading or even meaningfully impossible to use.

Besides variations in linear or lateral scale which may creep into the making of the microforms, another problem resides in the orientation of the path of a given strip on the microform. In attempting to greatly magnify a microform strip and read-out therefrom either visually or to storage for subsequent copying, only an extremely small error as viewed on the microform also is magnified and may cause the reproduced image formed to wander even outside the lateral imaging limits.

It is, accordingly, a general object of the present invention to provide a new and improved imaging system which overcomes at least many of the performance deficiencies and difficulties experienced in the prior art.

Another object of the present invention is to provide a new and improved imaging system which affords features available to the user heretofore unavailable.

A still further object of the invention is to provide a new and improved apparatus which enables the visual observation of an enlargement of a chart recording reduced to microform and the concurrent preparation of a print-out of selected portions of that which appears in the microform.

Still another object of the present invention is to provide apparatus which enables the user easily to adjust selectively differences in scale on ultimate reproduction in order to ensure that reproduction is a true replica in terms of scale of an original, compensating for changes in scale which may have occurred within the original or a copy.

A related object of the present invention is to provide a new and improved method of creating a fine tuning of the degree of magnification in a reproduction of a recording in order to render the reproduction dimensionally faithful as compared with an original or a reference.

A particular object of the present invention is to provide a new and improved method of compensating for errors which may creep into a recording technique, come into being by reason of material changes in either apparatus or recording media or exist in the reproduction arrangement.

Apparatus implemented in accordance with the present invention includes a source of illumination which is propagated along a predetermined path. A medium which carries an image is disposed in that path. An imaging screen is located in a portion of the path of the illumination beyond the medium, and a projection lens system is located with respect to the medium and is adjustable to focus the image upon the screen. An image storage element is disposed in a discrete portion of the path of the illumination beyond the medium. The medium is caused effectively to move along a given path, movement of the medium sweeping a moving segment of the image across the screen and also presenting a moving section of the image in a discrete path which leads to the storage element. Finally, the system has means for adjusting selectively the length of one of the path portions.

One particular approach involved includes a method of correlating scale in an image as reproduced from a recording media and with relationship either to an original from which the recording was made or to some other reference.

The features of the present invention which are believed to be patentable are set forth with particularity in the appended claims. The organization and manner of operation and use of the invention, together with further objects and advantages thereof, may best be understood by reference to the following description taken in connection with the accompaning drawings, in the several figures of which like reference numerals identify like elements, and in which:

As established in the introduction, the apparatus and method to be described appear to have application within a number of different fields where techniques of chart recording and analogous manners of fixing information may occur. While use of the invention has been investigated and undergone experimentation with respect to several fields, by far the greatest portion of the development thus far has been specifically addressed to the petroleum-producing industry. Accordingly, the specific embodiment first to be described will employ terms and terminology and examples taken from radioactive well logging chart recordings. It is, nevertheless, fully contemplated to implement the same principles within other fields, such as those mentioned in the introduction.

Figure 1:
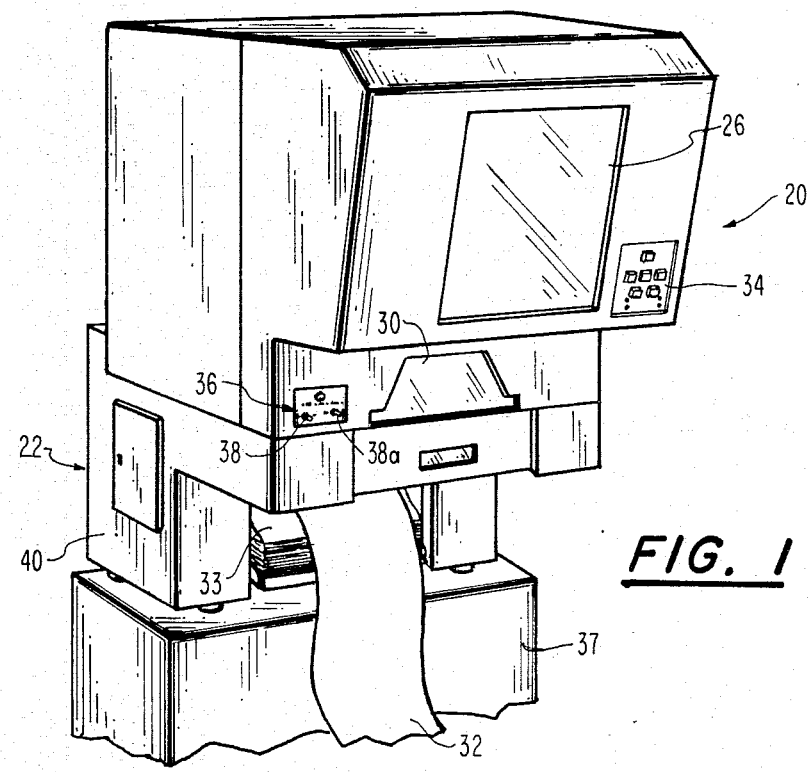
FIG. 1 is a perspective view of a reader-printer system.

As shown in FIG. 1, a reader-printer system 20 is housed within a cabinet assembly 22 which includes various cabinet structures that house different modules within the overall system. Facing the user is an image screen 26 along with various controls and an opening 30. A print-out hard-copy sheet 32 projects outwardly toward the user from near the bottom of the unit. Sheet 32 is supplied from a fan-folded stock 33. Control panels 34 and 36 are accessible to the user.

Of course, reader-printer 20 may be mounted upon a base 37 which provides for mobility across the floor. Desirably, the different modules are selected to have vertical dimensions such that the user will be presented with image screen 26 at a level above the floor which meets specifications of governmental and industry-association standards for convenience to the operator. In that connection, it is believed to be desirable that at least main control panel 34 be positioned alongside image screen 26, so as to project most forwardly toward the user. In addition, control panel 36 may be positioned either upwardly on that forwardly-facing surface, alongside image screen 26, or on the side of the unit. Control panel 34 is, in itself, very conventional, including, of course, a main on-off switch and indicator lights to indicate that different movements required are functioning properly. Control panel 36 includes but two switches 38 and 38A, here labeled "size" with "plus" and "minus" and "magnification" of "12x" or "24x", for functions which will be further described. In the front of the lower module 40 is a slot 42 through which chart paper is fed. It preferably is fan folded and stacked at 33 on a tray 43. Alternatively, it may be in roll form. In either case, the paper supply may be contained within a lower cabinet.

For the reproduction of a hard-copy printout, the present system may be adapted to any of a number of different copying machines. Some of the features to be discussed further would be of value no matter whether the manner of printout was thermographic, xerographic, photographic or otherwise as different copying approaches have been called. Of course, this would include the newer introduction to the marketplace of laser-beam printers which may be adapted in a conventional form or, and this is within the contemplation of the method of approach, even to be under the control of signals which have been digitized in connection with the original recording of the information as from a well log or other type of linear information profile.

For present purposes of reasonableness of cost, obtaining prints of good readability and, yet, avoiding the need of special copy medium that may be either or both of unduly expensive or subject to destruction of the printed image, applicant prefers a so-called "plain-paper copier" of the xerographic type. Of course, a copy printer which accepts only individual sheets is not convenient for use with chart recordings, although that could be accomplished with the expenditure of the necessary time to "align and paste". One option which led to the present embodiment does employ a roll-type supply to a xerographic copier, and some users may prefer that approach. The best manner of implementation at the present time appears to be the use of printing paper stock assembled with fan folding, leading to convenience of containment both before and after use.

Figure 2:
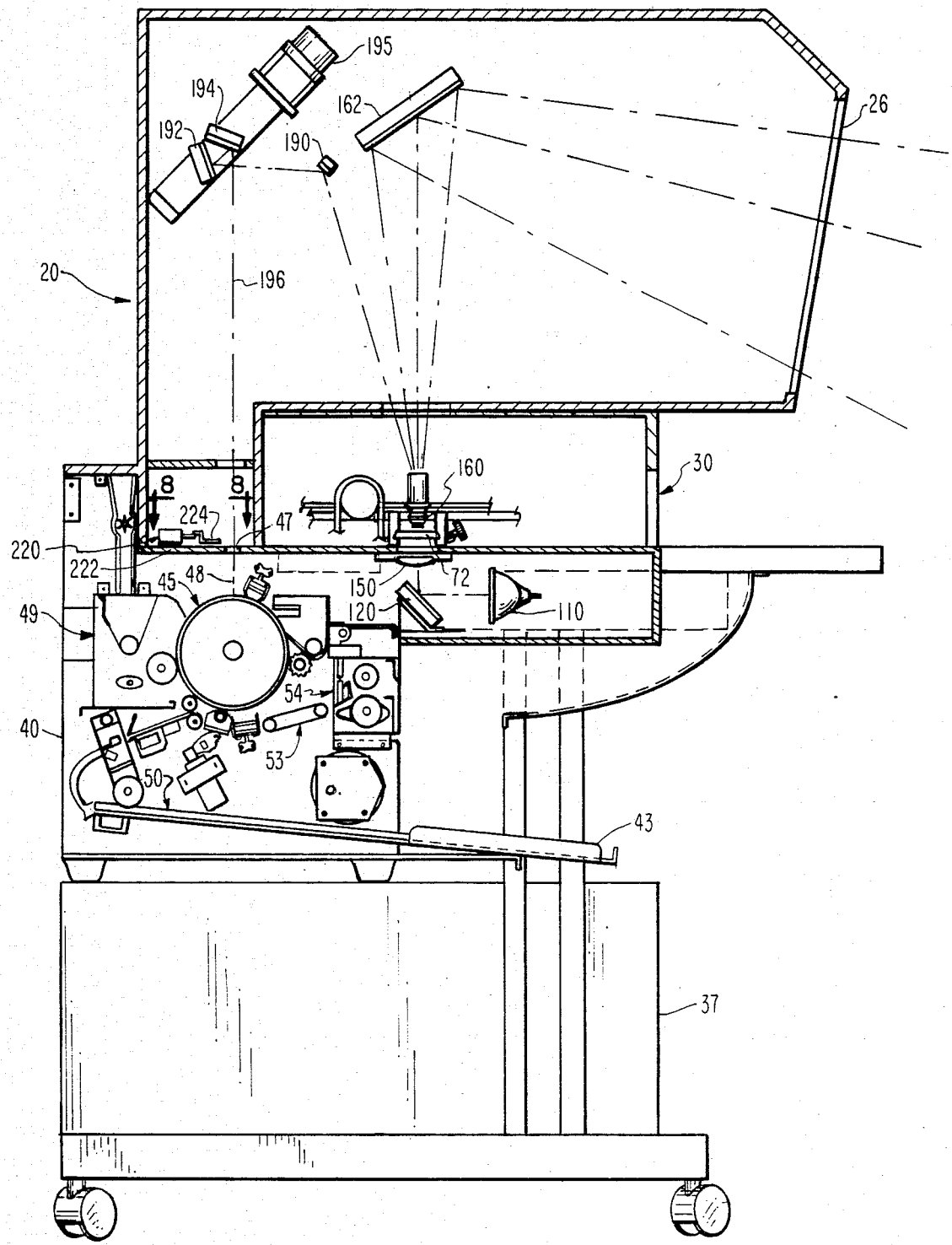
FIG. 2 is an enlarged partially-schematic side-elevational view taken along a vertical slice through the system of FIG. 1.
Figure 9:
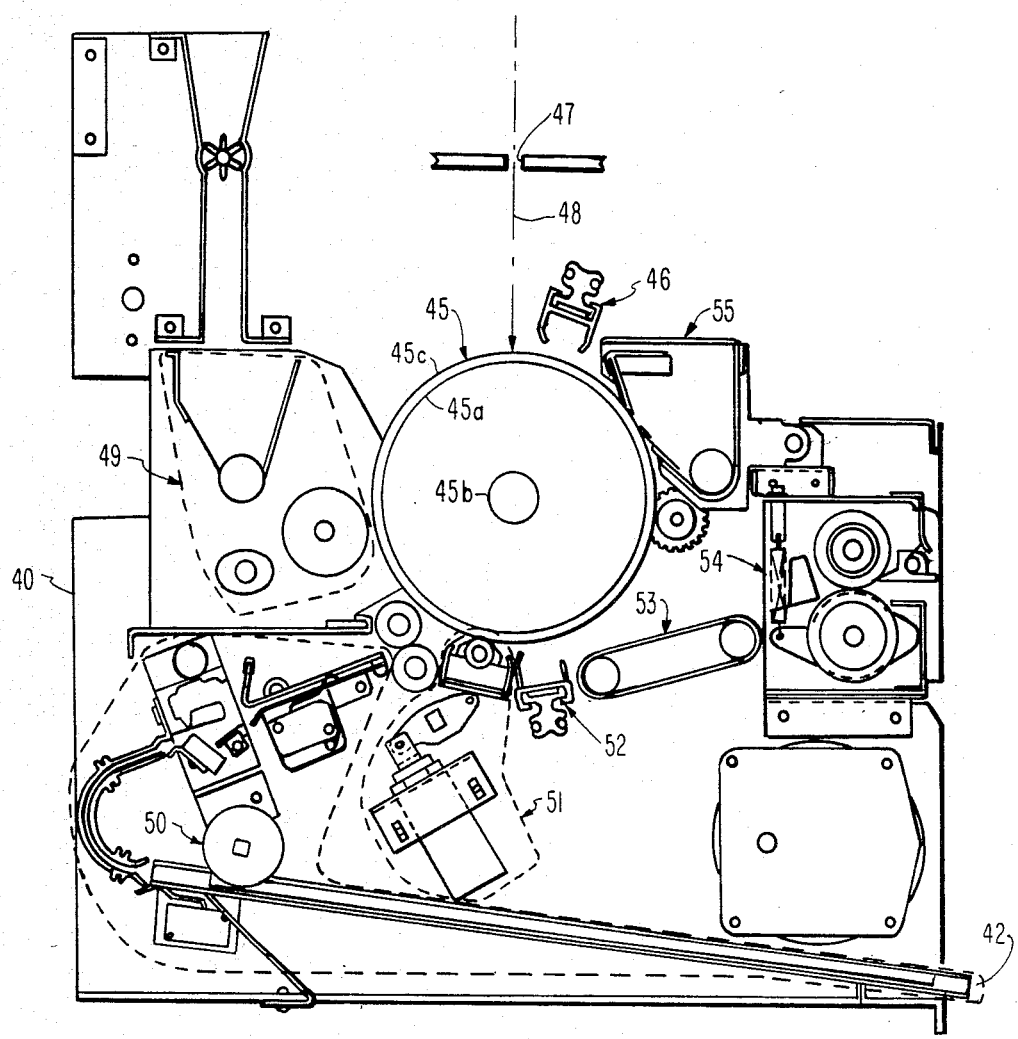
FIG. 9 is an enlarged side-elevational view of a portion of that shown in FIG. 2.

However, fan folding of chart paper has presented its own problems for use in xerographic printing with respect to reproduced lack of resolution at or near the folds. This problem was solved in accordance with the disclosure in U.S. Pat. No. 4,423,951, granted Jan. 3, 1984 and assigned on its face to Petro-Fax, the same assignee as the present invention. Accordingly, the copying apparatus of that patent represents the preferred mode of implementation for use with the system herein under discussion, and its disclosure is fully incorporated by reference herein. Included in FIGS. 2 and 9 is a representation of that which was disclosed by that patent and which forms a part of this preferred embodiment.

Thus, in that apparatus, an original document is moved past an exposure lamp and a photoconductive drum 45 is rotated counterclockwise past a charge corona assembly 46. Drum 45 is conventionally a metal cylinder 45a coated with selenium, selenium arsenic or selenium tellurium alloys, arsenic-triselenide, cadmium sulfide or other suitable photoconductive materials which are mounted on a shaft 45b. Charge corona assembly 46 charges the surface 45c of drum 45. When selenium-type photoconductive materials are employed, a positive charge is applied, while a negative charge is applied in the case of using a material such as cadmium sulfide.

As the charged drum 45 rotates past an exposure aperture 47 along a path 48, an image of the original document is projected onto the surface of drum 45 by the transmission of light from the exposure lamp through the non-image areas of the original document. In the area of surface 45c to which the exposure light is projected, the charge on surface 45c is neutralized, while the image area retains a charged latent image of the original.

Drum 45 continues to rotate counterclockwise past a magnetic brush developer unit 49 that dispenses toner particles to the charged latent image on drum 45. Those toner particles have a charge of opposite polarity to the polarity of the latent image, so that they are electrostatically attracted to that latent image area. As drum 45 continues to rotate in a counterclockwise direction, it comes into contact with a sheet of copy paper which is transported by a copy feed roller assembly 50 to the vicinity of a roller transfer corona apparatus 51. Apparatus 51 forces the copy paper tightly against drum 45 and emits a charge of slightly greater magnitude than that of the charge corona established at assembly 46. In turn, this causes the toner particles to release themselves from surface 45c of drum 45 and be transferred to the copy paper.

The copy paper is then electrostatically held to drum 45 until it reaches an alternating current stripper corona unit 52 which neutralizes the charge on the surface of drum 45. That allows the copy paper to release from drum 45. By means of a belt conveyor 53, the copy paper, which now has an unfused toner image of the original document on its surface, passes through a heated roller system 54. System 54 melts and fuses the toner image into the copy paper which now becomes the finished copy. Continuing counterclockwise, any toner particles remaining on drum 45 are removed by a cleaning blade unit 55, and drum 45 becomes ready to continue into a repeat copy cycle.

Figure 5:
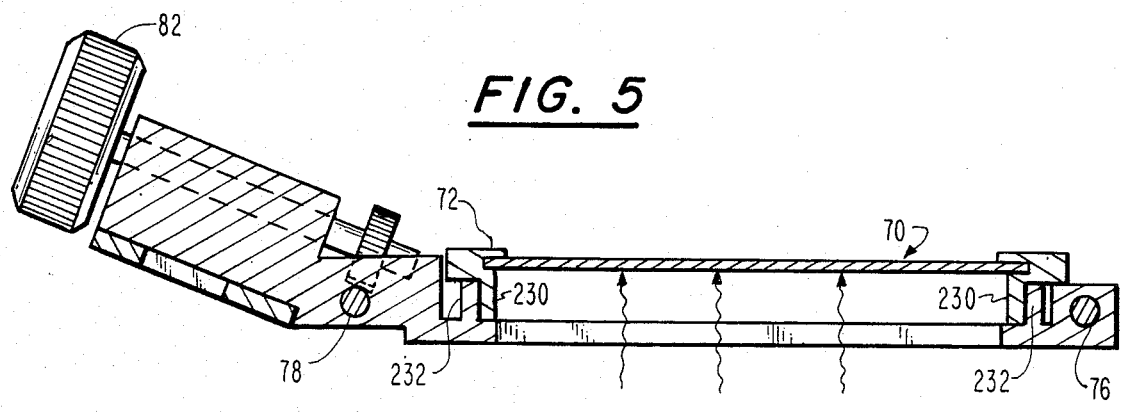
FIG. 5 is an enlarged side-elevational view, partly in section, of a component shown in FIG. 2.
Figure 7:
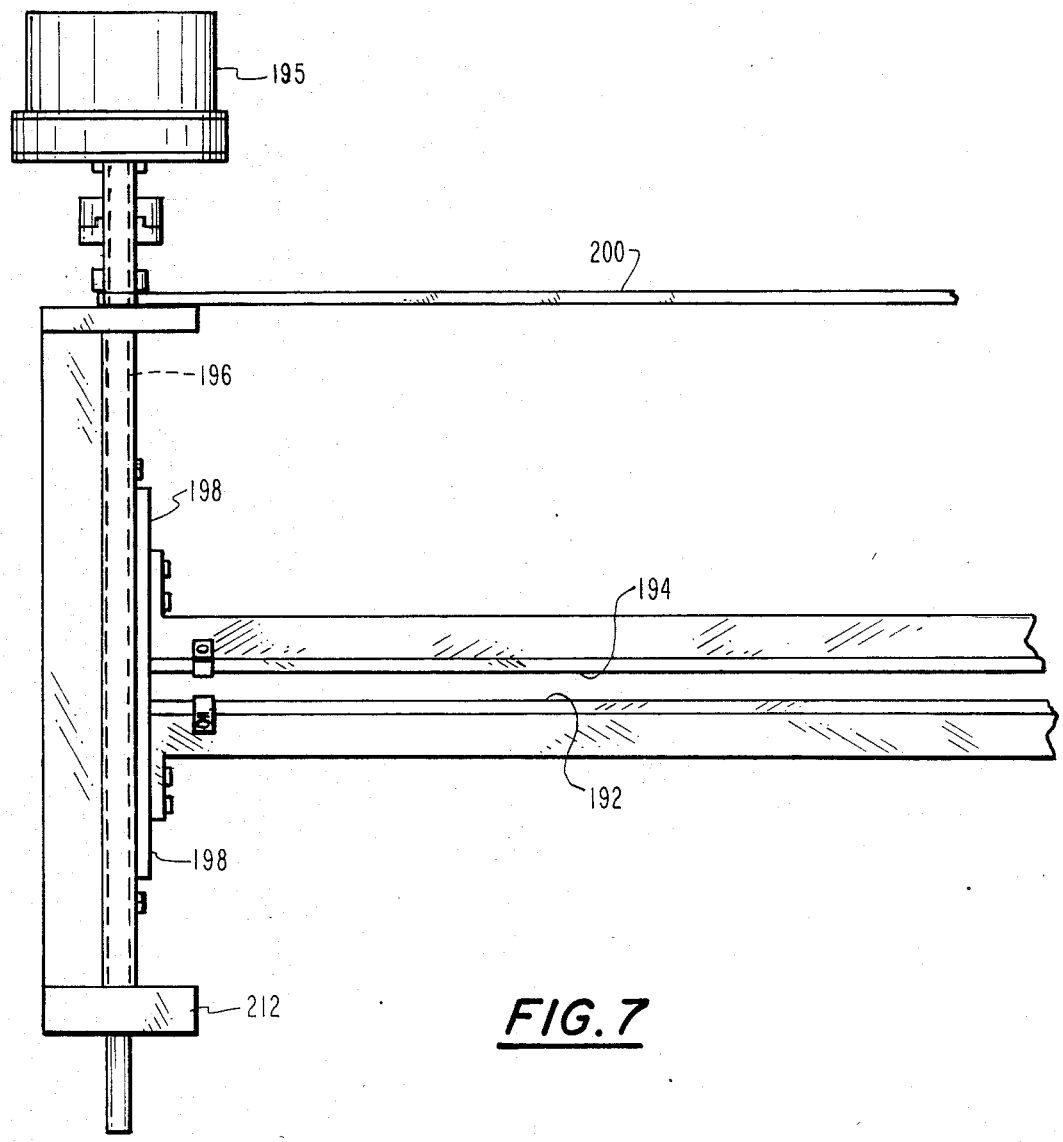
FIG. 7 is an enlarged fragmentary view taken along the line 7—7 in FIG. 6.

The copying apparatus may include any number of modifications and alternatives as further described in cross-referenced U.S. Pat. No. 4,423,951. These include the copying of opaque materials and various different forms of corona apparatus. Also fully discussed therein are the kinds of coatings which may be employed to accomplish the corona discharge functions that serve so well to yielded an improvement particularly in the case of employing folded copy output material. As now constructed, the present embodiment preferably involves the use of the embodiment of FIG. 5 of the aforesaid U.S. Pat. No, 4,423,951, and the detailed description of that, again, is incorporated hereinto by reference.

For accomplishing the purpose of reproducing images from a microform, that microform is received upon a platen disposed within the interior accessed through opening 30. While the necessary movements of that platen, and, thus, of the microform, will be further described, it is sufficient to note at this time that they may be accomplished, and in this specific embodiment are accomplished, by use of a device as specifically described in U.S. Pat. No. 4,118,114, granted Feb. 12, 1980, in the names of Karl H. Gensike and Ronald Sam, assigned on its face to Photomatrix Corporation, although the implementation of that apparatus herein is different from that which is claimed in that patent. Nevertheless, its disclosure is incorporated herein by reference as a convenient source of disclosure with respect to certain essentials also developed within the prior art of the references which were cited against that patent.

Figure 3:
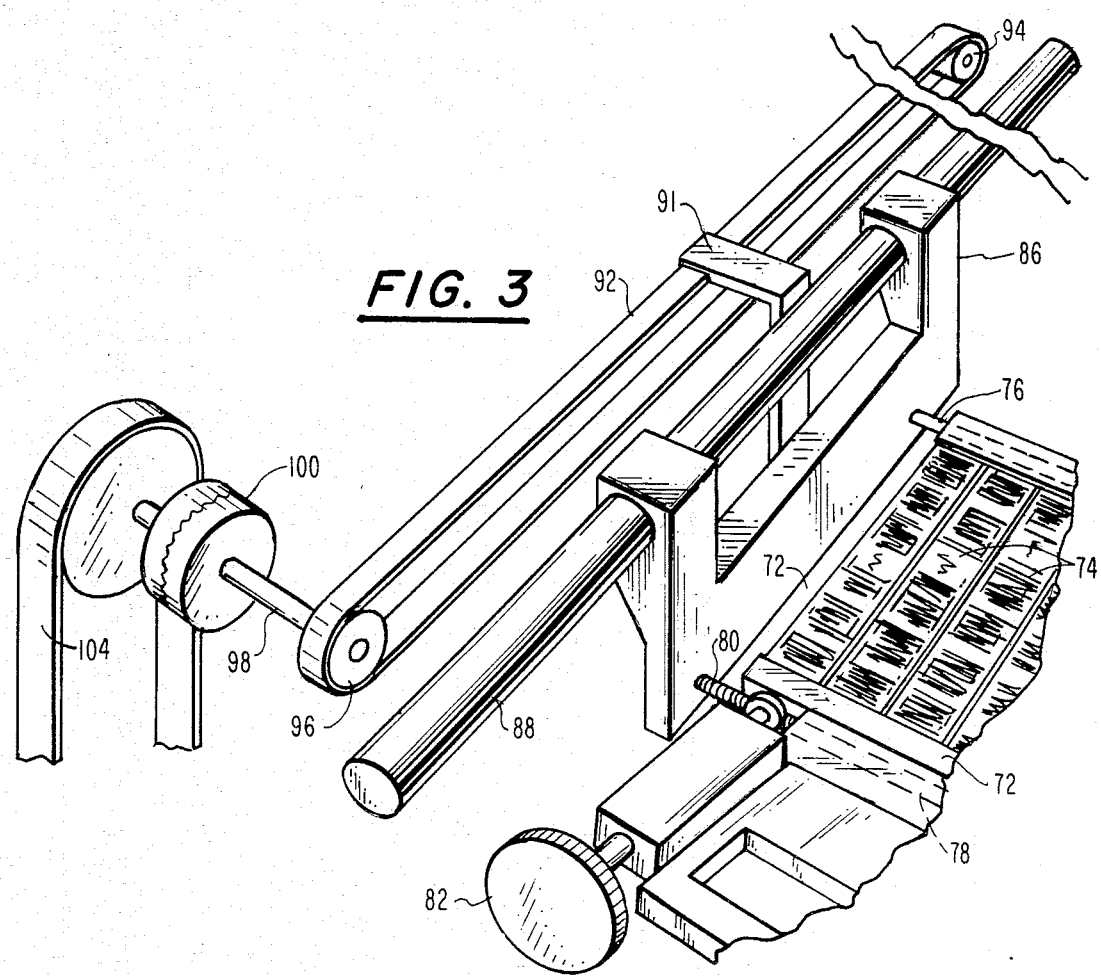
FIG. 3 is an enlarged fragmentary isometric view of a component shown in FIG. 2.
Figure 4:
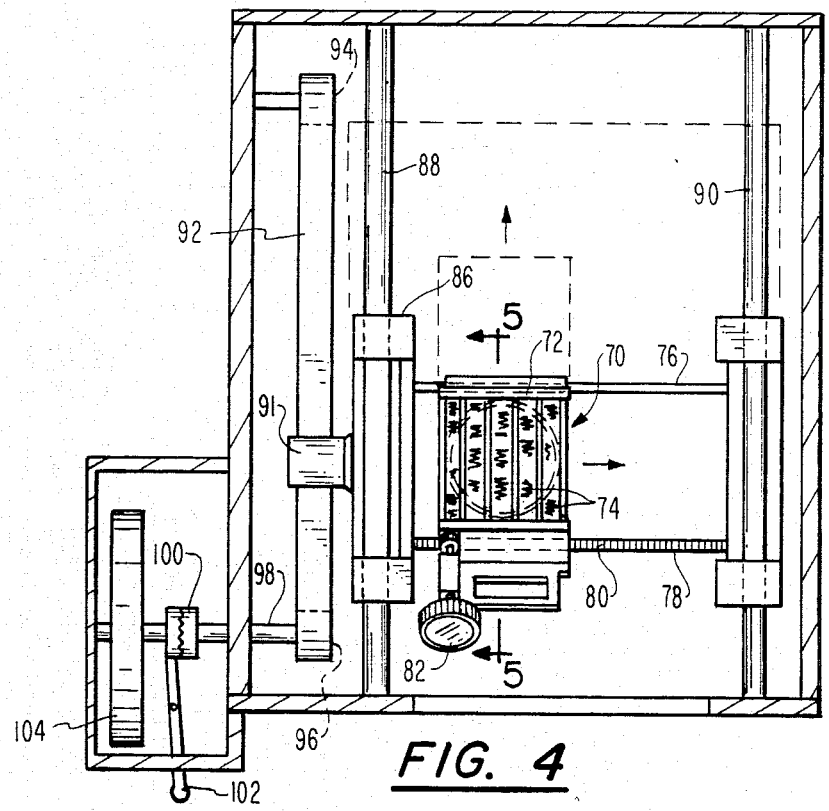
FIG. 4 is a reduced plan view of a component of FIG. 3.

Thus, and as shown in FIGS. 3 and 4 which are taken directly from that patent but necessarily involve a renumbering of components, a microform 70 is situated upon a platen 72 which accomodates movement of microform 70 laterally with respect to a series of five images 74 that represent successive segments of a chart recording. Platen 72 is slidingly mounted on transfer rails 76 and 78, with latter being formed to define gear teeth 80 which cooperate with a spur gear moved by a thumbwheel 82 in order to allow that lateral positioning. It is that lateral positioning which permits the user to reach in through opening 30 and select which one of tracks 74 is selected at a given time.

Of course, thumbwheel 82 may be mechanized and correlated with limit switches or the like which detect arrival at the end of a first track and causes automatic movement of platen 72, so as to present a second track for reproduction by the system on a separate movement of platen 72 longitudinally of the tracks. With present-day disparities which exist on microforms as between the spacing between different tracks and problems with their alignment, it is still preferred to use manual adjustment as by thumbwheel 82 for centering a given track 74 laterally with respect to what is to be its longitudinal movement.

That longitudinal movement is accomplished by securing rails 76 and 78 to a carriage 86 that rides upon fore and aft directed guides 88 and 90. That is, guides 88 are 90 are oriented in the same direction as tracks 74. A clamp 91 secures one side of carriage 86 to a belt 92 which is disposed at one end about an idler pulley 94 and at its other end to a drive pulley 96. Drive pulley 96 is mounted on one end of a shaft 98 which leads to a clutch 100 controlled by an operating lever 102 arranged to engage and disengage clutch 100. The driving end of clutch 100 is connected to that which is in this case another belt-driven pulley 104 coupled to the same motive mechanism which moves the hard copy substrate through the printing apparatus.

It will be observed in the aforementioned U.S. Pat. No. 4,118,114 that operation of clutch 100 is by way of a button which cuts off the supply of paper feed. An alternative to that contemplated herein is simply the use of a limit switch which senses the forward movement of platen 72 in order to cause return of platen 72 back to its initial location at a beginning position relative to track 74 as well as with coordination to automatic successive lateral platen movement.

As should be quite obvious, all of these different movement controls are capable of being incorporated into a system which has the necessary drive movements and includes what now is rather quite conventional electronic circuitry for energizing both linear actuators and motor drives to interrelate the desired different functions which include selection as between fore and aft movement, transverse movement and stop, start and reverse. Costwise, it is preferred at the present to leave a large portion of this control to manual operation, especially because the user of the apparatus herein disclosed often has no control over the variations which occur in microform 70.

Returning from basic structural implementations which may or may not be employed, FIG. 2 discloses the overall system, in this case located atop the prior art apparatus of the aforementioned U.S. Pat. No. 4,423,951 and taking advantage of the prior art apparatus of prior U.S. Pat. No. 4,118,114. Illumination from a light source 110 is reflected at right angle by a mirror 120 and directed upwardly through a condensor lens 150 and microform 70 into a projection lens 160 and then to an angled mirror 162 oriented to reflect an almost-full image to image screen 26. That much, with its condenser lens 150 directing the light into projection lens 160 serves to display, on image screen 26, the desired image. Projection lens 160, of course, is adjustable at least manually to allow proper focusing for best resolution.

However, what may be called a trailing "slice" of the reproduced image is oriented to impinge upon a reflector 190 from which that slice is directed to a mirror 192 angularly oriented relative to another mirror 194 which cooperates with mirror 192 to redirect that image slice ultimately along a new path 196 to storage drum 45 along what becomes path 48. In this embodiment as expressly shown, mirrors 192 and 194 are inclined at 45° relative to one another, so as to cause a 90° turn in the path of that portion of the image which arrives by way of mirror 190. This is not a necessary limitation to orientational relationship, although it is preferred because it obviates any need for compensation of what may be called "foreshortening" in the case of other such orientations.

Figure 6:
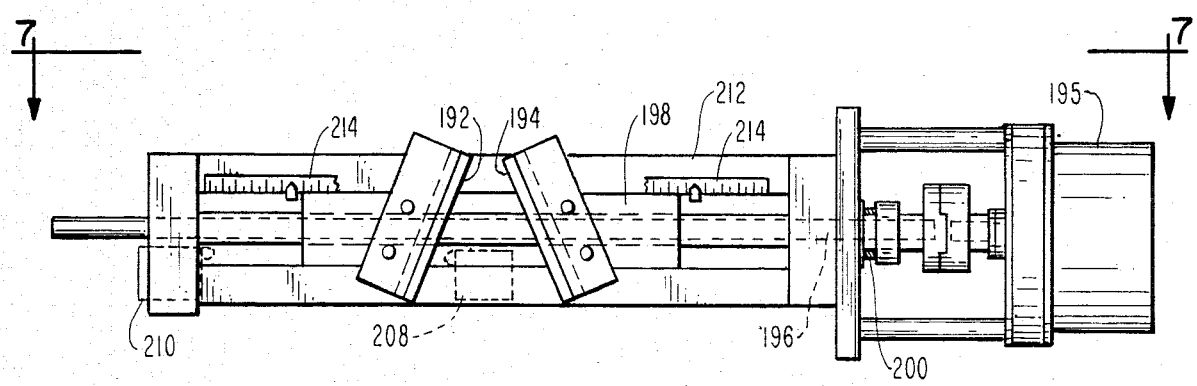
FIG. 6 is an enlarged side-elevational view of a component shown in FIG. 2.
Figure 8:
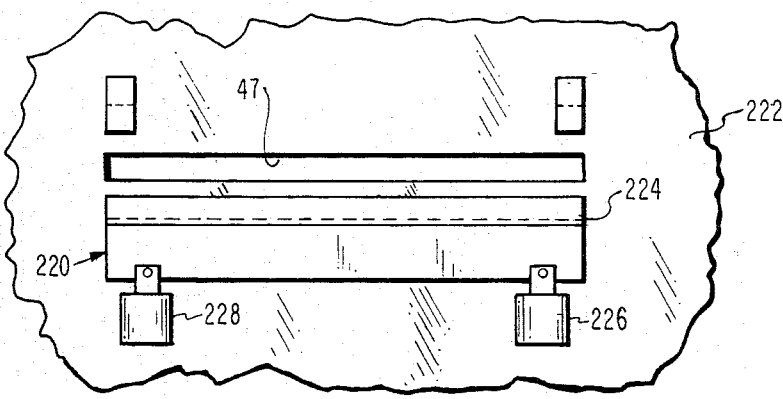
FIG. 8 is an enlarged fragmentary plan view of a component shown in FIG. 2.

As shown in FIG. 6, mirrors 192 and 194 are mounted at each end upon a lead screw arrangement driven by a motor 195. Mirror assemblies 192 and 194 threadably ride upon respective lead screws 196 and each oppositely threaded on their opposing end portions. That is, lead screw rotation in one direction moves mirrors 192 and 194 apart, while such rotation in the opposite direction moves them toward one another. Each end of mirrors 192 and 194 rides on a track surface defined on the corresponding mounting platforms 198.

In this case, motor 195, as shown, directly drives one lead screw 196 and is coupled by a frictionally-secure belt drive 200 that ultimately supplies moving energy to the second lead screw. The belt drive, between the two lead screws, is herein preferred because it avoids the unnecessary requirement of a separate motor drive system for the other mirror ends, one which could have to be synchronized and, thereby, involve additional circuitry. Limit switches 208 and 210 and included with mounting to a carriage 212 that supports lead screw 196 and the other apparatus such as motor 195. Limit switches 208 and 210 are used to prevent overdrive on the system of motor 195 and belt 200, should a limit of movement be reached that otherwise might damage the mirrors or jam the apparatus. A scale 214 may be included for assistance in set-up or for other purposes.

It will be observed that the focusing of the image upon screen 26 is adjustable in normal manner by means of projection lens 160. In itself, this is not unlike the adjustment of the lens on any movie projector. At the same time, an adjustment by means of projection lens 160 will focus the "slice" of the image which is dissected in order to enable recording upon that which is a storage medium, herein drum 45 used for ultimate hard copy production. Through the adjustment of angulated mirrors 192 and 194, the user is enabled to adjust the degree of magnification, by path-length variation, of that which is delivered for hard copy recording as compared to that which appears on image screen 26. In this connection, the "plus" and "minus" indications on panel 36 in FIG. 1 relate directly to the control of the degree of magnification that actually occurs on the production of the hard copy. A "plus" means that the user wants to expand the degree of magnification in the hard copy, while the selection of the "minus" indicates that he wishes to reduce it. As will by now be very apparent, the entire objective is achieved by enabling the user to adjust the reprint on the produced hard copy so as more accurately to obtain an ultimate hard copy reproduction which linearly corresponds to the original, compensating for any and all variations that may have occurred by reason of whatever failures previously occurred in the formation of the microforms or in shrinkage or expansion of different materials which have served as intermediates in the overall system.

Also preferably included is a shutter 220 located in the path 196 from mirror 194 to storage drum 45 along path 48. Shutter 220 is coordinated with movement of platen 72. That is, the arrangement of shutter 220 insures that the storage medium is exposed only during operation of the movement of the microform and only to a narrow slice. It includes aperture 47 in a bottom plate 222. Shutter 220 includes a cover shape 224 movable by solenoids 226 and 228 to open and close aperture 47.

Platen 72 is coupled to rails 76 and 78 by rings 230 and 232. The mounting enables microform 70 to be aligned accurately with the path of movement of platen 72 and of sheet 32.

It will be seen that the particular embodiments described assure a precise adjustment of the image size onto a photo-conductor drum or the like for reproducing an image upon copying paper or the equivalent, while at the same time compensating for any possible errors which may have occurred all the way between the original microform camera, reduction ratio and even the projection lenses used in the apparatus here described. As has been pointed out, that adjustment and correction may be vital for geological measurements as well as those involved with the medical fields, manufacturing processes, power production or whatever. Printout in hard copy is enabled to be accomplished at only that portion of a given record which is needed for further study. Thus, what may be thousands, or perhaps even miles, of chart recordings, can be reviewed and printed out only as to very limited portions that need further analysis.

Certain details which have been found to be suitable are the inclusion in the traveling system of mirrors 192 and 194 of the use of front surface aluminum mirrors with a coating having 94% reflectivity. As here embodied, it is the outlying part of the total image which is captured for delivery to the storage drum, apart from when that part can be seen on image screen 26. An important part of the approach disclosed relates not particularly to specific apparatus but to a method of correlating scale in an image as reproduced from a recording media and with a relationship either to an original from which the recording was made or to some other reference. That is, the user may achieve linear adjustment of scale as between an original, which may have included aberrations, a copy therefrom which may have included its own aberrations, and the shrinkage or expansion which may have occurred in either or both, to assure being able to get an accurate final printout of that which is needed for a worthwhile analysis or work effort.

The approach presented involves the magnification and reproduction of a recorded image both visually and in hard copy. A segment of the image is projected onto an image screen, while a section of the image is projected into a hard-copy system. The results from that hard copy systems are then compared with a reference, after which there is an adjustment of characteristics of magnification of the projection of the section in correspondence with the reference. The present approach yields attractive definition by physically separating that section from that segment.

In the apparatus employed for sweeping a moving segment of the image across an image screen and also presenting a moving section of the moving image in a discrete path to a storage medium, there is adjustment of the length of the discrete path portion. A split of the projected images is obtained, so that the section transmitted to the image screen is separated from the segment transmitted to the storage element. Adjustment is specifically made of the pathway within that discrete path portion. Modifications included may adapt the varying of the orientation of the path of the image relative to the path of movement of the section under ultimate observation. With the image being in elongated form and exhibiting information, there is an approach which handles variations in both length and width. Specific apparatus is designed for safe and efficient operation.

While particular embodiments of the invention have been shown and described, and various modifications and the inclusion of other features have been mentioned, it will be obvious to those of ordinary skill in the art that changes and modifications may be made without departing from the invention in its broader aspects. Therefore, the aim in the appended claims is to cover all such changes and modifications as fall within the true spirit and scope of that which is patentable.

I claim:

1. A readout system comprising:
   a source of illumination which is propagated along a predetermined path;
   a medium carrying an image and disposed in said predetermined path;
   an imaging screen located in the path of said illumination beyond said medium;
   a projection lens system located with respect to said medium and adjustable to focus said image upon said screen;
   an image storage element disposed in a discrete portion of the path of said illumination beyond said medium;
   means for effectively moving said medium along a given path, movement of said medium sweeping a moving segment of said image across said screen and also presenting a moving section of said image in said discrete path to said storage element;
   and means for operationally adjusting the length of said discrete path portion.

2. A readout system comprising:
   a source of illumination which is propagated along a predetermined path;
   a medium carrying an image and disposed in said predetermined path;
   an imaging screen located in the path of said illumination beyond said medium;
   a projection lens system located with respect to said medium and adjustable to focus said image upon said screen;
   an image storage element disposed in a discrete portion of the path of said illumination beyond said medium;
   means for effectively moving said medium along a given path, movement of said medium sweeping a moving segment of said image across said screen and also presenting a moving section of said image in said discrete path to said storage medium;
   means for adjusting the length of said discrete path portion,
   said adjusting means including a first reflector disposed in said discrete path portion at an angle effectively of forty-five degrees relative thereto;
   a second reflector disposed laterally to one side of said discrete path portion and inclined thereto at a reverse angle effectively of forty-five degrees;
   and means for adjusting the distance between said first and second reflectors.

3. A readout system as defined in claim 2 in which said storage element is located to receive an image segment reflected from said second reflector.

4. A readout system as defined in claim 1 in which said section is disposed beyond said segment.

5. A readout system as defined in claim 1 in which said adjusting means affects the length only of said discrete path portion.

6. A readout system as defined in claim 1 in which said moving means includes means for varying the orientation of the path of said image relative to the path of movement of said section.

7. A readout system as defined in claim 1 in which said image is in elongated form and exhibits informational variations of characteristic in at least one of length or width.

8. A readout system as defined in claim 7 in which said variations occur in length.

9. A readout system as defined in claim 7 in which said variations occur in width.

10. A readout system as defined in claim 2 which further includes means for limiting said adjustment of distance between said reflectors.

11. A readout system as defined in claim 1 in which said moving of said segment appears simultaneously with said presenting of a moving section of said image.

12. In a method which involves magnifying and reproducing a recorded image both visually and in hard copy, the steps comprising:
    projecting a segment of said image onto a viewing screen;
    projecting a section of said image into a hard-copy system;
    comparing the results from said hard copy system with a reference representative of the image recorded;
    and adjusting the characteristics of magnification of projection of said section in correspondence with said reference.

13. A method as defined in claim 12 in which said section is physically separated from said segment.

* * * * *